(12) United States Patent
Trezza et al.

(10) Patent No.: US 7,020,400 B2
(45) Date of Patent: Mar. 28, 2006

(54) MULTI-WAVELENGTH OPTICAL COMMUNICATION SYSTEM

(75) Inventors: John A. Trezza, Nashua, NH (US); Mani Sundaram, Nashua, NH (US); Richard J. Williams, Hollis, NH (US)

(73) Assignee: Altera Corporation, Santa Clara, CA (US)

( * ) Notice: Subject to any disclaimer, the term of this patent is extended or adjusted under 35 U.S.C. 154(b) by 952 days.

(21) Appl. No.: 09/737,226

(22) Filed: Dec. 14, 2000

(65) Prior Publication Data

US 2006/0013595 A1 Jan. 19, 2006

Related U.S. Application Data

(60) Provisional application No. 60/173,076, filed on Dec. 24, 1999.

(51) Int. Cl.
*H04B 10/12* (2006.01)
*H04B 10/00* (2006.01)
*G02B 6/12* (2006.01)

(52) U.S. Cl. .................. 398/164; 398/149; 385/14

(58) Field of Classification Search ................ 398/164, 398/168, 169, 170, 142, 149, 165; 385/27, 385/84, 14, 129, 146; 257/79, 13
See application file for complete search history.

(56) References Cited

U.S. PATENT DOCUMENTS

| | | | |
|---|---|---|---|
| 4,548,464 A * | 10/1985 | Auracher et al. .............. 385/7 |
| 4,720,706 A * | 1/1988 | Stine ......................... 345/84 |
| 5,029,176 A | 7/1991 | Chang-Hasnain |
| 5,061,027 A | 10/1991 | Richard ...................... 385/14 |
| 5,268,973 A | 12/1993 | Jenevein |
| 5,469,286 A * | 11/1995 | Nicole ........................ 398/164 |
| 5,477,363 A | 12/1995 | Matsuda |
| 5,541,756 A | 7/1996 | Chang-Hasnain et al. |
| 5,546,209 A | 8/1996 | Willner et al. |
| 5,578,162 A | 11/1996 | D'Asaro et al. |
| 5,706,114 A * | 1/1998 | Erteza ........................ 398/131 |
| 5,818,984 A | 10/1998 | Ahmad et al. |
| 5,822,475 A * | 10/1998 | Hirota et al. ................. 385/24 |
| 5,858,814 A | 1/1999 | Goossen et al. |
| 5,875,272 A | 2/1999 | Kewitsch et al. |
| 5,910,851 A | 6/1999 | Flaherty |
| 5,978,526 A | 11/1999 | Morikuni et al. |
| 6,061,481 A * | 5/2000 | Heidrich et al. .............. 385/14 |
| 6,096,496 A * | 8/2000 | Frankel ....................... 435/4 |
| 6,288,644 B1 * | 9/2001 | Mathews et al. ............. 340/555 |
| 6,317,242 B1 * | 11/2001 | Ozeki et al. ................. 398/164 |

FOREIGN PATENT DOCUMENTS

JP 03 089327 4/1991

OTHER PUBLICATIONS

M. Ajmone Marsan et al, Modelling Slotted Multi-Channel Ring All-Optical Networks, *IEEE*, 1997, p. 146-153.

(Continued)

*Primary Examiner*—M. R. Sedighian
*Assistant Examiner*—Dzung Tran
(74) *Attorney, Agent, or Firm*—Maine & Asmus

(57) ABSTRACT

A multi-wavelength optical communication system includes a number of emitters each of which emits radiation at a different wavelength; a plurality of the detectors each of which senses radiation at a different wavelength corresponding to the radiation from one of the emitters and a shared waveguide including a scattering medium to transmit emitted radiation to the detectors.

20 Claims, 5 Drawing Sheets

OTHER PUBLICATIONS

Marco Ajmone Marsan et al, Access Protocols for Photonic WDM Multi-Rings with Tunable Transmitters and Fixed Receivers, *SPIE*, pp. 59-72, vol. 26921.

Carl Beckmann, Applications: Asynchronous Transfer Mode and Synchronous Optical Network, *Handbook of Fiber Optic Data Communication*, 1998, pp. 385-414, Academic Press.

Floyd E. Ross, An Overview of FDDI: The Fiber Distributed Data Interface, *IEEE Journal on Selected Areas in Communications*, Sep. 1989, pp. 1043-1051, vol. 7 No. 7.

PCT International Search Report dated Jun. 20, 2001 of International Application No. PCT/US00/34824 filed Dec. 20, 2000.

Krishnamoorthy, Ashok V., Firehose Architectures for Free-Space Optically-Interconnected VLSI Circuits, SPECIAL Issue on Parallel Computing with Optical Interconnects, Journal of Parallel and Distributed Computing, Nov. 1996, pp. 1-10 complete article also see marked up cover and p. 6 included.

Travers, Christine M. et al., VLSI Photonic Smart Pixel Array for I/O System Architectures, pub Jan. 1998, This is best copy found.

Kitayama, Ken-Ichi et al, Two Dimensional Parallel Optical Data Link: Experiment* IEEE, 1996 pp. 206-214.

Neff, John A. et al. VCSEL/CMOS Smart Pixel Arrays for Free Space Optical Interconnects, IEEE 1996 pp. 282-289.

Kosaka, Hideo et al., Plastic-Based Receptacle-Type VCSEL-Array Modules with One and Two Dimensions Fabricated Using the Self Allignment Mounting Technique, IEEE 1987 or 1997 pp. 382-385 This is best copy found.

No Author, Smart Pixel Array (SPA) for VLSI-Photonics, DARPA website, this is the best copy found.

Zhao, Chunhe et al. "General Purpose Bidirectional Optical Backplane: High-performance Bus for Multiprocessor Systems", IEEE, Jul. 1995, pp. 188-194.

European Search Report dated Oct. 7, 2004 of Application No. EP 00 99 3221 International filing date Dec. 20, 2000.

* cited by examiner

MULTI-WAVELENGTH OPTICAL COMMUNICATION SYSTEM

RELATED APPLICATIONS

The present application claims priority from U.S. Provisional Patent Application No. 60/173,076, filed Dec. 24, 1999, entitled METHOD AND APPARATUS FOR DECREASING ROUTING COMPLEXITY FOR LATERAL DATA TRANSMISSION IN OPTICAL TRANSCEIVER ARRAYS.

FIELD OF INVENTION

This invention relates to a multi-wavelength optical communication system.

BACKGROUND OF INVENTION

Interchip, chip to board, and board to board communications currently present serious problems in data transfer including speed and bandwidth. Intrachip communications do have high speed capacity but the interconnection of the different parts of the chip using metal conductors has given rise to a routing problem. Presently, in order to provide necessary intrachip connections multi-layer (six or seven layers) fabrication is required which is time consuming and expensive. To overcome this, optical communications are being used which increase bandwidth and speed even in intrachip communications. In chips using gallium arsenide optical communications are possible between electronic circuits on the chip but even here the routing problem persists. In one optical communication scheme communications are effected using optical transmitters and receivers; however they must be aligned one to one so that the signals from each emitter are only received by the intended detector.

BRIEF SUMMARY OF THE INVENTION

It is therefore an object of this invention to provide an improved multi-wavelength optical communication system on a chip or in a multi-chip module with several chips on a common substrate.

It is a further object of this invention to provide such an improved multi-wavelength optical communication system which has greater speed and bandwidth.

It is a further object of this invention to provide such an improved multi-wavelength optical communication system without complex routing.

It is a further object of this invention to provide such an improved multi-wavelength optical communication system without multi-layer conductor fabrication.

The invention results from the realization that an effective high speed, high bandwidth optical communication system without routing problems can be achieved with a number of emitters each of which emits radiation at a different wavelength and a plurality of detectors each of which senses radiation at a different wavelength corresponding to the radiation from one of the emitters which all communicate through a shared waveguide. A shared waveguide may be defined as a confined area with external reflectors. The shared waveguide may also include dispersive particles, sized for the particular wavelengths in use, so that each wavelength is spread throughout the shared waveguide.

This invention features a multi-wavelength optical communication system having a number of emitters each of which emits radiation to the different wavelength. There are a plurality of detectors each of which senses radiation at a different wavelength corresponding to the radiation from one of the emitters. A shared waveguide including a scattering medium transmits emitted radiation to the detectors.

In a preferred embodiment an emitter may include a vertical cavity surface emitter laser. The emitter may include a scattering grating for redirecting the emitted radiation laterally through the shared waveguide. A detector may include a filter for selectively passing one of the wavelengths from one of the emitters. The filter may include a Bragg grating, the shared waveguide may scatter the lateral leakage radiation from the emitters. The emitter may include an LED. The emitter may include an edge emitting laser. The emitter may include a reflector for redirecting the emitted radiation laterally through the shared waveguide. The emitters and detectors may be disposed in a generally planar array. The shared waveguide may be generally planar. The emitters and detectors may be disposed on a chip. The chip may be gallium arsenide. The chip may be flip chip bonded onto a silicon chip. The shared waveguide may be disposed on an integrated circuit chip to provide intra chip communication. The shared waveguide may be disposed part on one integrated circuit chip and part on another integrated circuit chip to provide inter chip communication or on a multi-chip module with several integrated chips on a common substrate for intra module communication. The shared waveguide may include a reflective medium around it for containing the scattering radiation. The reflective medium may be formed by a change in the refractive index. The reflective medium may include a reflective material. There may be an opaque barrier between the emitters and detectors so that all signals are forced through the shared waveguide for absorbing the radiation.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
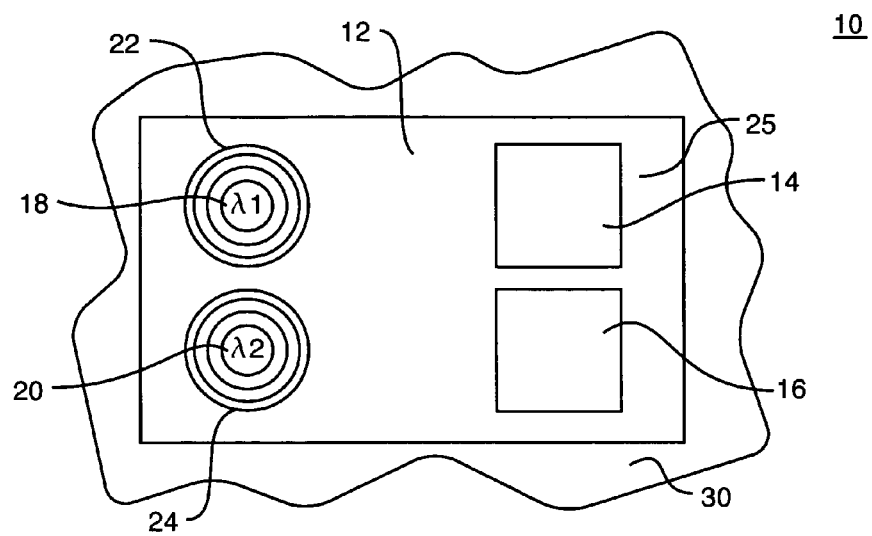
FIG. 1 is simplified diagrammatic plan view of a multi-wavelength optical communication system according to this invention.

There is shown in FIG. 1 a multi-wavelength optical communication system 10 including a shared waveguide 12 including a number of emitters 14, 16 and a number of detectors 18, and 20. Emitters 14 and 16 may be LEDs or lasers such as vertical cavity surface emitting lasers (VCSEL). Each one of emitters 14 and 16 emits radiation at a different wavelength: emitter 14 at wavelength $\lambda_1$ and emitter 16 at wavelength $\lambda_2$. Detectors 18 and 20 are either detectors that are tuned to sharply reject all but the wavelength of one of the emitters 14 and 16, or detectors 18 and 20 may be surrounded by a filtering device such as a Bragg filter 22 and 24 which filters all but the desired frequency. For example, Bragg filter 22 may filter out all radiation but $\lambda_1$ so that detector 18 only responds to emitter 14 and Bragg filter 24 may filter out all radiation except $\lambda_2$ so that detector 20 only responds to radiation from emitter 16. Contrary to the illustration in FIG. 1, the emitters and detectors do not have to be aligned in accordance with this invention. Further, although in FIG. 1 the emitters and detectors are equal in number, this is not a necessary limitation of the invention as there may be more of one than the other.

Shared waveguide 12 operates to transmit all wavelengths from all of the emitters to all of the detectors 18 and 20 even though detectors 18 and 20 will only accept a specific wavelength. Shared waveguide 12 provides a scattering function rather than a channeling function and may be made of any suitable material, e.g. powdered glass, quartz, and gallium arsenide. Shared waveguide 12 may include dispersive particles so that every wavelength is spread throughout the waveguide. Shared waveguide 12, emitters 14 and 16, and detectors 18 and 20 all may be fabricated on a gallium arsenide chip and mounted on a silicon chip such as CMOS substrate 30. Thus, the electroptic functions of the optical communication functions of emitters 14, 16 and detectors 18 and 20 may be coupled to conventional CMOS electronic circuitry for intra chip and inter chip as well as chip to chip and chip to board communications. Emitters 14 and 16, detectors 18 and 20 and Bragg filters 23 and 24 may be part of a gallium arsenide chip 25.

Figure 2:
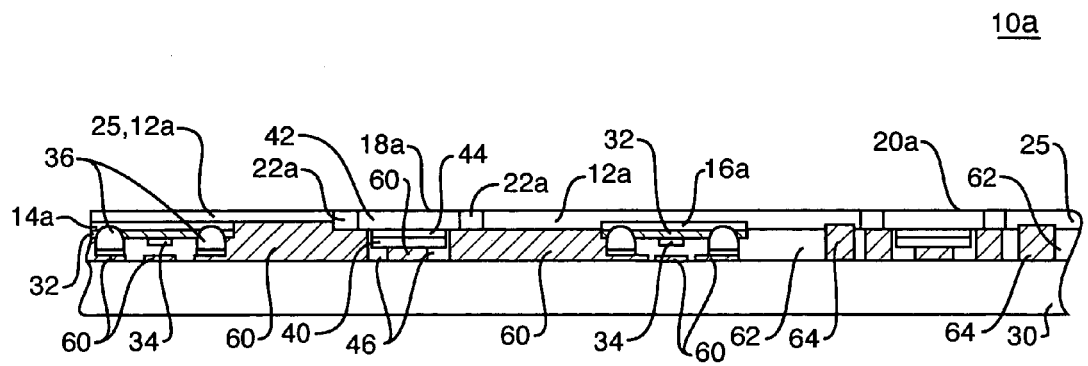
FIG. 2 is a more detailed side sectional elevational view of a multi-wavelength optical communication system such as shown on FIG. 1.

In another construction, FIG. 2, each emitter 14a, 16a, includes a mirror 32 (where the emitters are VCSELs), as shown with respect to emitter 14a, an active portion 34 and a pair of contacts or bumps 36 and 38 which serve in the flip chip bump bonding of the gallium arsenide chip that contains the emitters, detectors, and shared waveguide with the silicon chip 30 which contains the CMOS substrate and circuitry. Chip 30 may also be a SiGe, InP, or GaAs based ASIC or a multi-chip module/fanout substrate. Also shown in FIG. 2 are detectors 18a and 20a; each detector as indicated at detector 18a includes a P section 40, one N section 42 and one I section 44 and an epoxy support 46 which supports the active section 48 surrounded by Bragg filter 22a. Both the emitter 14a, 16a and detectors 18a and 20a may be P-I-N diodes. The flip chip bonding technique for the gallium arsenide chip 25 carrying the optical components and the silicon chip 30 containing the CMOS circuitry is disclosed more fully in co-pending U.S. patent applications Ser. Nos. 09/653,369 (now U.S. Pat. No. 6,337,265); 09/654,425 (now U.S. Pat. No. 6,316,286); and 09/653,378 (now U.S. Pat. No. 6,344,664), all filed on Sep. 1, 2000, assigned to the assignee and incorporated herein by reference in their entirety. An opaque barrier 60 is placed around detector 18a to isolate detector 18a from undesirable light. The shared waveguide 12a may be formed from the residual gallium arsenide present as a result of gallium arsenide chip 25 by simply not etching away all the remaining gallium arsenide after the flip chip bonding has been effected but rather leaving some there to act as the shared waveguide. While barrier 60 may extend completely between detector 18a and emitters 14a and 16a this is not a necessary limitation of the invention as for example that area could be filled by epoxy or some other filter 62 as shown with respect to detector 20a.

Figure 3:
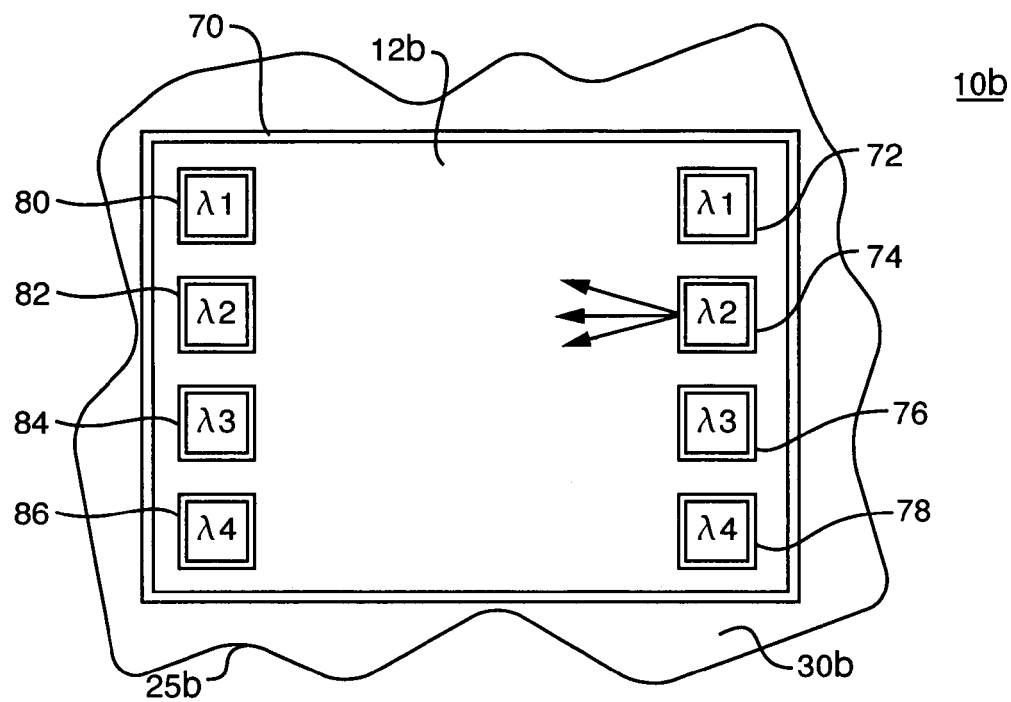
FIG. 3 is a top plan view similar to FIG. 1 but with an increased number of emitters and detectors with a dark field barrier surrounding them.

To prevent the escape of the emitted radiation which is scattering through shared waveguide 12b, FIG. 3, a barrier 70 may be placed completely around all the emitters 72, 74, 76, and 78 and all the detectors 80, 82, 84, and 86. The opaque barrier may be any suitable epoxy which is opaque at the wavelengths in use. Barrier 70 may also be reflective. Although there have been shown an equal number of emitters 72–78 and detectors 80–86, this is not a necessary limitation of the invention. Also note that the wavelength $\lambda_1-\lambda_4$ of the emitters do not coincide directly with the wavelengths $\lambda_4-\lambda_1$ of the directly juxtaposed detectors 80–86. The particular wavelengths used may be closely spaced so that $\lambda_1-\lambda_4$ may be 815 nm, 816 nm, 817 nm, 818 nm or commonly available lasing wavelengths may be chosen such as 850 nm, 980 nm, 1300 nm, and 1550 nm. Although thus far the shared waveguide is shown as a monolithic structure, this is not a necessary limitation of the invention.

Figure 4:
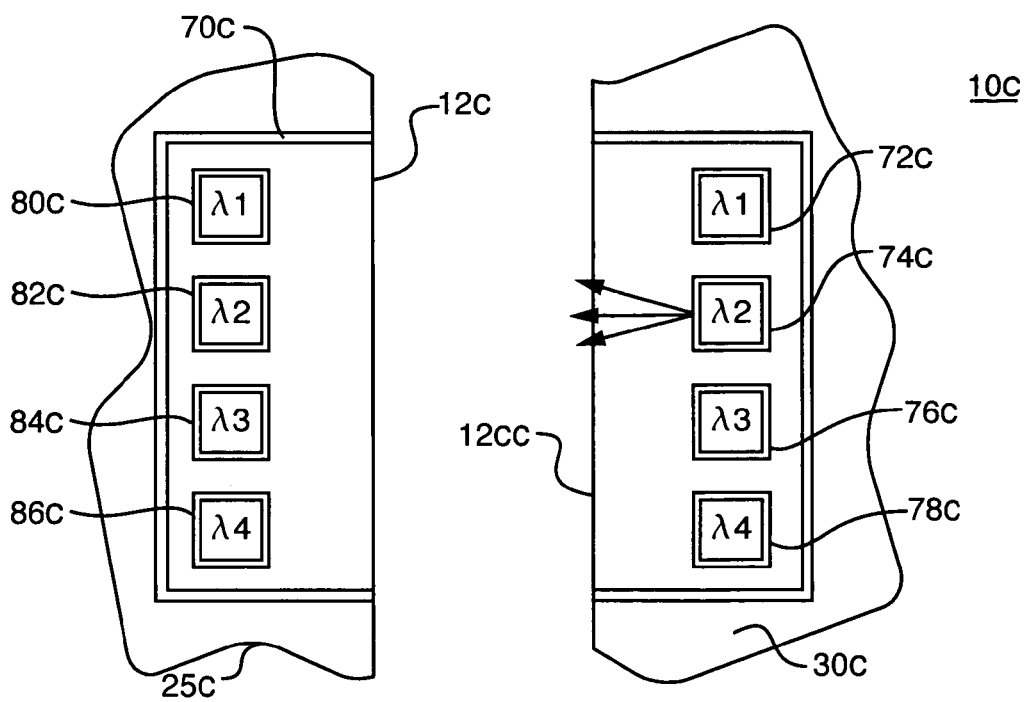
FIG. 4 is a view similar to FIG. 3 but with the emitters and detectors on different chips and the associated waveguide on different chips for inter chip communication.

For example, as shown in FIG. 4, the waveguide may be broken into two portions 12c and 12cc so that one portion of the waveguide, 12c, is on one chip or board and the other portion, 12cc, is on another chip or board thereby providing inter chip or inter board or chip to board communication. Although thus far all of the emitters have been grouped together and the detectors separately grouped together, this is not a necessary limitation of the invention as the detectors and the emitters can be mixed as shown for example in FIGS. 5–7.

Figure 5:
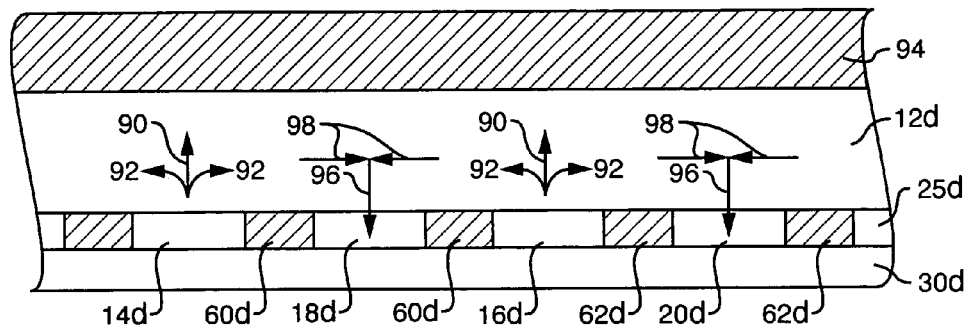
FIGS. 5, 6, and 7 are diagrammatic side sectional elevational partial views illustrating specific constructions of the multi-wavelength optical communication system according to this invention.
Figure 6:
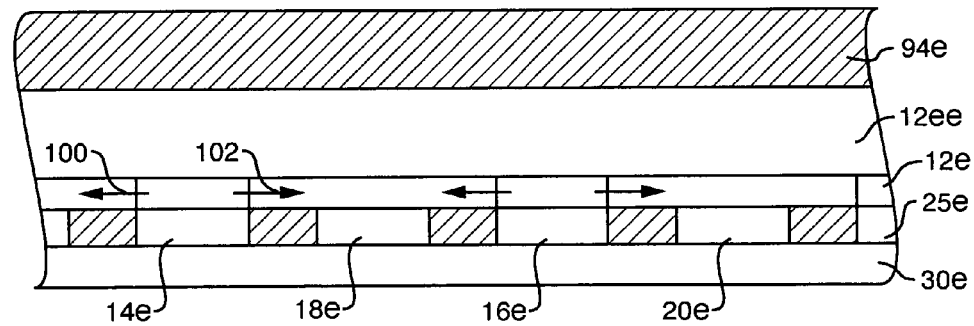

In FIGS. 1–4, the radiation scattered from the emitter to the detectors is generally leakage radiation out the side of the VCSELS which travels generally in a planar field in a generally planar shaped shared waveguide 12 but none of these aspects are limitations on the invention as the shared waveguide need not be planar and could be a multi-level or three-dimensional structure. In addition, the radiation to be scattered by shared waveguide 12 may be the primary emitted beam instead of or in addition to the leakage radiation. For example, as shown in FIG. 5, each of the emitters 14d and 16d projects a beam 90 some of which 92 is scattered but some of which propagates directly out of emitter 14d and 16d until it encounters layer 94 which may be a reflecting surface such as a metal like silver or it may be a cladding of lower index of refraction. In either case, layer 94 will reflect or it will deflect the radiation back down so that it is scattered and is returned to the detectors as shown by direct radiation 96 and 98 entering detector 18d. Here there are no filters or Bragg gratings and the detectors themselves have sharp spectral response as is well known in the art. Emitters 14e and 16e, FIG. 6, may be edge emitting diodes or lasers such that the light is emitted out of its side 102 and moves through waveguide 12e to a detector which is tuned to the same wavelength. This may be a specifically side emitting laser or it may be the leakage radiation spoken of earlier. The shared waveguide may be expanded to that shown at 12ee and there may be added a layer 94e which can be a reflecting surface or a cladding of lower index as indicated previously.

Figure 7:
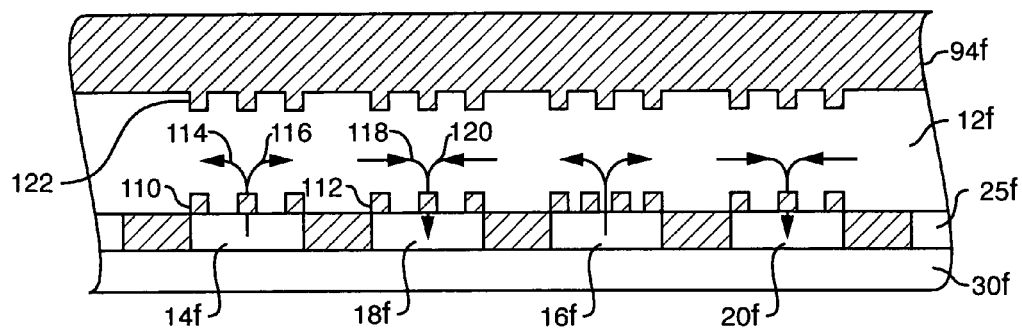

In another construction, each emitter 14f and 16f and each detector 18f and 20f, FIG. 7, may be provided with a diffraction grating 110, 112, respectively, as shown with respect to emitter and detector 14f and 18f, respectively. These gratings deflect the radiation so that it is directed laterally 114, 116 as indicated with respect to emitter 14f and is laterally received and redirected into detector 18f as indicated at 118 and 120. Further control of the lateral scattering of the light can be effected by another control layer 94f which includes a diffraction grating 122 over the entire layer or just at portions opposite each emitter and detector for further deflecting the light back to laterally scatter through the shared waveguide 12f.

Figure 8:
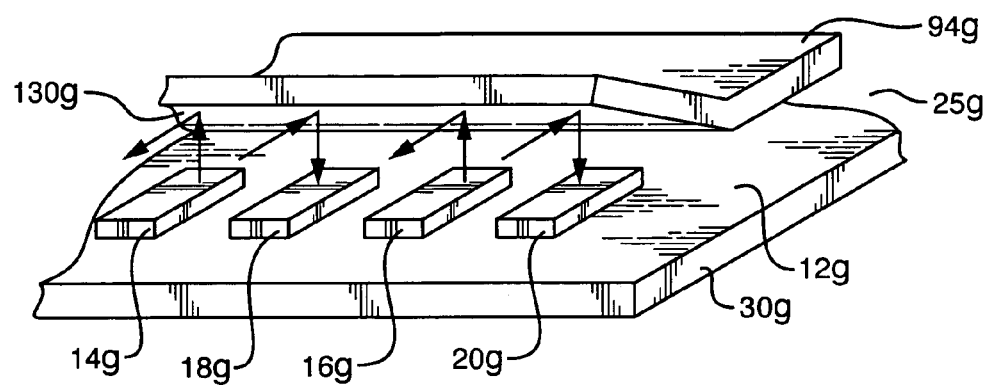
FIG. 8 is a front three dimensional view of the multi-wavelength optical communication system according to this invention employing a reflective surface to enhance radiation scattering.
Figure 9:
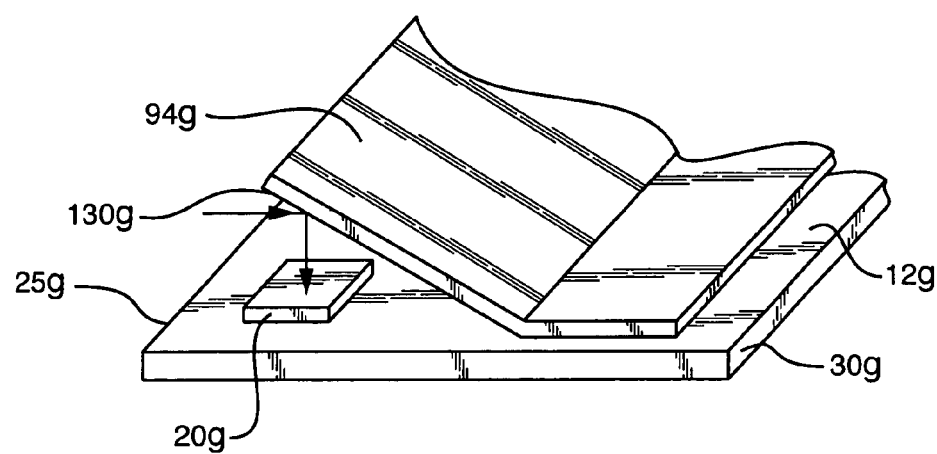
FIG. 9 is a side three dimensional view similar to FIG. 8.
Figure 10:
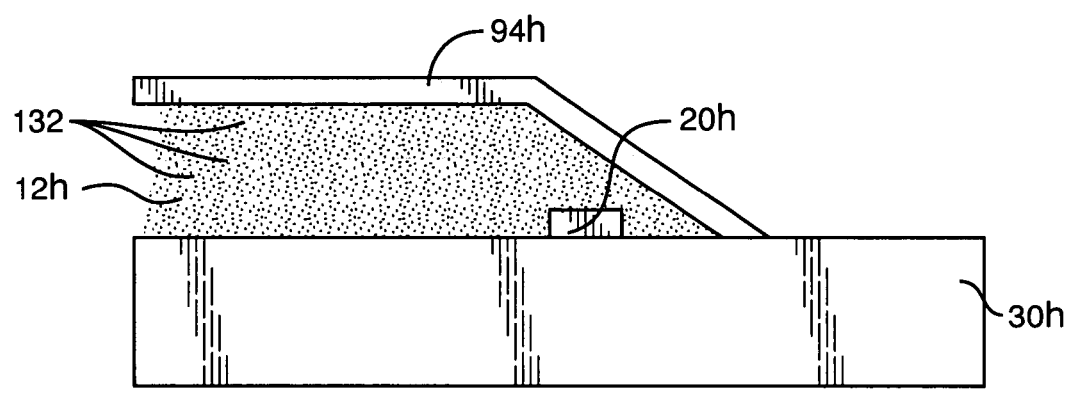
FIG. 10 is a side sectional elevational diagrammatic view of another construction of the multi-wavelength optical communication system according to this invention.

Another control layer 94g, FIG. 8 can be fabricated directly on CMOS layer 30g to redirect the radiation by 90 degrees leaving emitters 14g and 16g and returning to detectors 18g and 20g as shown more clearly in FIG. 9 where the redirection of light is achieved by the control structure and scattering by the shared waveguide. The underside 130g of layer 94g may be a reflective material or may be coated with a reflective material, for example, a metal such as silver to enhance its reflective properties. Although control layer 94g is shown as being fabricated on the CMOS layer 30g, it may also be fabricated directly on the shared waveguide.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

The invention claimed is:

1. An intra chip or intra multi-chip module on a shared substrate multi-wavelength optical communication system comprising:
    a number of emitters each of which emits radiation at a different wavelength;
    a plurality of detectors each of which senses radiation at a different wavelength corresponding to the radiation from one of said emitters; and
    a shared waveguide including a scattering medium configured with dispersive particles for transmitting emitted radiation to said detectors;
    wherein each emitter includes a scattering grating for redirecting the emitted radiation laterally through said shared waveguide.

2. The multi-wavelength optical communication system of claim 1 in which said emitter includes a vertical cavity surface emitting laser.

3. The multi-wavelength optical communication system of claim 1 in which a said detector includes a filter for selectively passing one of said wavelengths from said emitters.

4. The multi-wavelength optical communication system of claim 3 in which said filter includes a Bragg grating.

5. The multi-wavelength optical communication system of claim 1 in which said shared waveguide scatters the lateral leakage radiation from said emitters.

6. The multi-wavelength optical communication system of claim 1 in which said emitter includes an LED.

7. The multi-wavelength optical communication system of claim 1 in which said emitter includes an edge emitting laser.

8. The multi-wavelength optical communication system of claim 1 in which said emitters and detectors are disposed in a generally planar array.

9. The multi-wavelength optical communication system of claim 8 in which said shared waveguide is generally planar.

10. The multi-wavelength optical communication system of claim 1 in which said emitters and detectors are disposed on a chip.

11. The multi-wavelength optical communication system of claim 10 in which said chip is gallium arsenide.

12. The multi-wavelength optical communication system of claim 1 in which said chip is flip-chip bonded to a silicon chip.

13. The multi-wavelength optical communication system of claim 1 in which said shared waveguide is disposed on an integrated circuit chip to provide intrachip communications.

14. The multi-wavelength optical communication system of claim 1 in which said shared waveguide is disposed part on one integrated circuit chip and part on another integrated circuit chip to provide interchip communication.

15. The multi-wavelength optical communication system of claim 1 in which said shared waveguide is disposed part on a plurality of chips mounted on a common substrate to provide interchip communication.

16. The multi-wavelength optical communication system of claim 1 further including an opaque barrier for absorbing the radiation.

17. An intra chip or intra multi-chip module on a shared substrate multi-wavelength optical communication system comprising:
    a number of emitters each of which emits radiation at a different wavelength;
    a plurality of detectors each of which senses radiation at a different wavelength corresponding to the radiation from one of said emitters; and
    a shared waveguide including a scattering medium configured with dispersive particles for transmitting emitted radiation to said detectors;
    wherein each emitter includes a reflector for redirecting the emitted radiation laterally through said shared waveguide.

18. An intra chip or intra multi-chip module on a shared substrate multi-wavelength optical communication system comprising:
    a number of emitters each of which emits radiation at a different wavelength;
    a plurality of detectors each of which senses radiation at a different wavelength corresponding to the radiation from one of said emitters; and
    a shared waveguide including a scattering medium configured with dispersive particles for transmitting emitted radiation to said detectors, and a reflective medium for containing the scattering radiation.

19. The multi-wavelength optical communication system of claim 18 in which a reflective medium is a lower index of refraction from the waveguide.

20. The multi-wavelength optical communication system of claim 18 wherein the shared waveguide is disposed part on one substrate and part on another substrate, thereby allowing communication between circuitry on the substrates.

* * * * *